United States Patent [19]
Timm et al.

[11] Patent Number: 5,169,181
[45] Date of Patent: Dec. 8, 1992

[54] IMPACT RESISTANT ROTARY JOINT WITH GLIDE RING SEALS

[75] Inventors: Gerald L. Timm, Schoolcraft; James A. Medsker, Lawton, both of Mich.

[73] Assignee: The Johnson Corporation, Three Rivers, Mich.

[21] Appl. No.: 807,519

[22] Filed: Dec. 16, 1991

[51] Int. Cl.⁵ .............................. F16L 27/00
[52] U.S. Cl. ........................ 285/276; 285/13; 285/279; 285/375; 285/134; 277/85
[58] Field of Search .............. 285/276, 277, 13, 14, 285/279, 98, 375, 134; 277/85

[56] References Cited

U.S. PATENT DOCUMENTS

| | | | |
|---|---|---|---|
| 2,384,281 | 9/1945 | Carter | 285/276 |
| 2,599,664 | 6/1952 | Sloan | 285/276 X |
| 2,723,136 | 11/1955 | Deubler | 285/276 X |
| 2,964,340 | 12/1957 | Kinzie et al. | 285/276 X |
| 3,011,803 | 12/1961 | Buckner | 285/276 X |
| 3,405,980 | 10/1965 | Stonebraker | 285/276 X |
| 3,889,983 | 6/1975 | Freize et al. | 285/276 X |
| 4,408,685 | 10/1983 | Schilling et al. | 285/276 X |
| 4,606,561 | 8/1986 | Jackson | 285/134 |

FOREIGN PATENT DOCUMENTS

| | | | |
|---|---|---|---|
| 1007372 | 5/1952 | France | 285/276 |
| 2158536 | 11/1985 | United Kingdom | 285/276 |

Primary Examiner—Randolph A. Reese
Assistant Examiner—Timothy Aberle
Attorney, Agent, or Firm—Beaman & Beaman

[57] ABSTRACT

A rotary joint for rotating heat exchangers of the drum or roll type having a journal wherein damage to the rotary joint by radial impact forces is minimized by mounting the joint housing upon the rotating journal, the joint nipple is stationary and mounted upon the fluid receiving head and spherical roller bearings are interposed between the housing and nipple. The primary fluid seal is located adjacent the heat exchanger journal and impact forces between the seal components and nipple, and their surrounding structure, is absorbed by the use of annular elastic glide rings which also function as fluid seals.

6 Claims, 1 Drawing Sheet

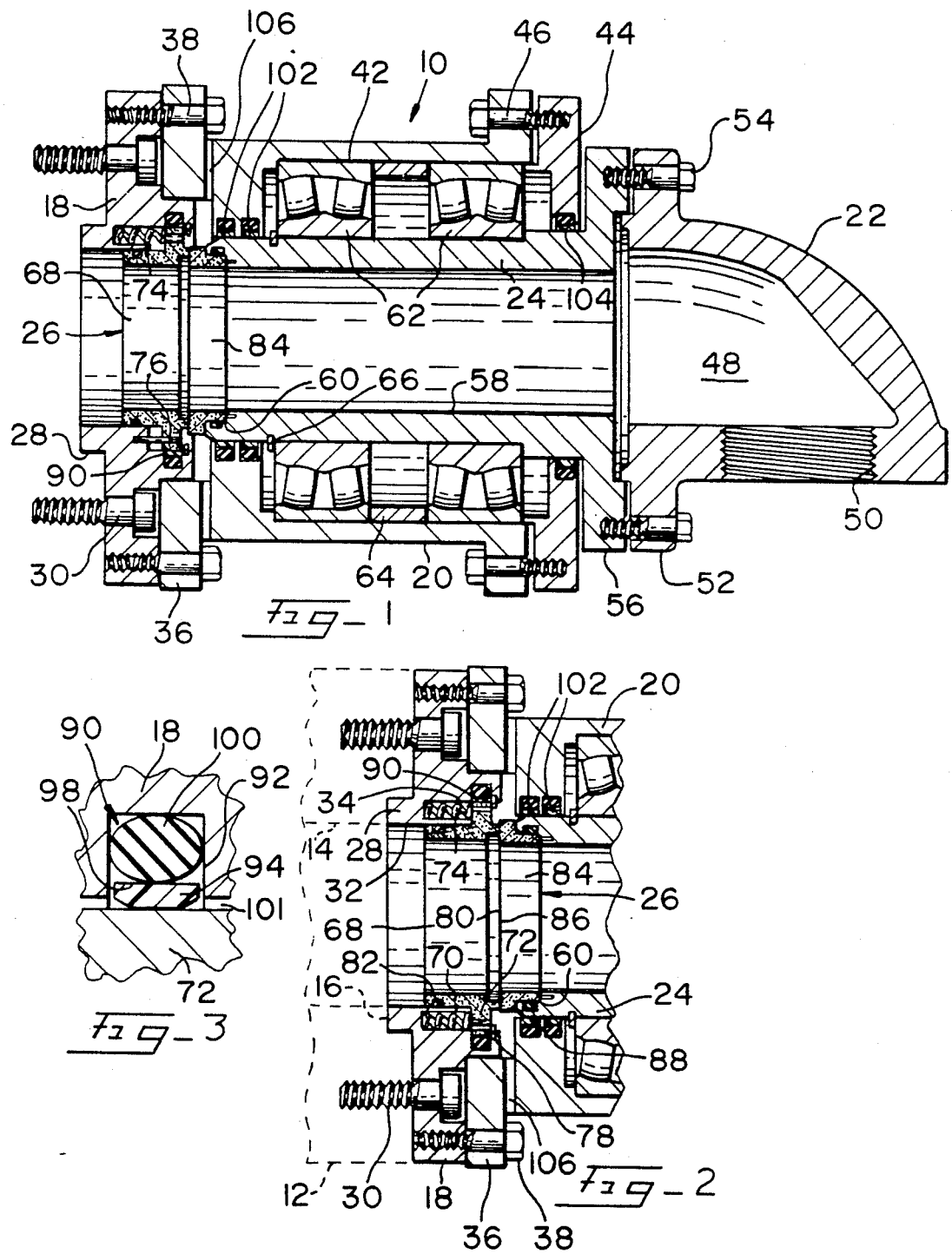

IMPACT RESISTANT ROTARY JOINT WITH GLIDE RING SEALS

BACKGROUND OF THE INVENTION

1. Field of the Invention

The invention pertains to rotary joints for connecting the interior of rotary heat exchangers with a stationary fluid supply or exhaust system. Rotary joints are commonly employed with steam heated dryer drums and cooling calendar rolls utilized in paper making apparatus.

2. Description of the Related Art

Rotary joints for supplying fluid medium to rotary heat exchanger drums or calendar rolls used in paper mills are subjected to high radial impact forces when the paper web being treated by the heat exchangers breaks and the web may unevenly wrap around the rolls forming a "cam" effect which separates the rolls and then permits the rolls to clash together. Such an event produces high radial impact forces on the rotary joints associated with such drums or rolls breaking the seals in the rotary joints causing the joint bearings to flood with coolant, and the bearings may be destroyed as lubricant is lost. Paper making mills run for extended durations as measured in months between shutdown, and it is very important that heating or cooling drums and rolls continue to rotate even though the seals and bearings may not be functioning as designed.

Conventional rotary joints used with calendar rolls employ a tubular nipple that is mounted upon the end of the calendar roll journal and extends into the housing of the rotary joint. The rotary joint housing is mounted upon the nipple by bearings, such as ball bearings, and sealing structure is located at the end of the nipple associated with a seal supported upon the housing. The outer end of the housing establishes communication with the fluid source, through a head or similar fitting.

With such conventional rotary joints as described above the nipple rotated with the calendar roll journal, and the rotary joint housing is stationary as is the seal mounted on the housing. Of course, the fluid supply fitting or head must be stationary, and with a typical self-supporting rotary joint of this type wherein the majority of the weight of the rotary joint as produced by the housing is stationary and is mounted upon the rotating nipple, radial impact forces imposed upon the roll journal transferred destructive forces upon the nipple and the journal, as well as the joint bearings, often causing serious damage to the seals resulting in a flooding of the joint bearings and eventual bearing failure.

Rotary joints utilizing stationary housings must be relatively large in size, which creates space and clearance problems, and typical rotary joints of the aforedescribed type weigh approximately 190 pounds, which imposes high radial forces on the roll journal structure.

Such conventional rotary joints utilize axially biased annular seals usually formed of sintered carbon, and such seals include an enlarged diameter hub disposed adjacent a smaller diameter seal stem. An O-ring encircling the stem imposes a compressive force thereon, and during roll impact conditions high radial forces may be momentarily imposed upon the seal hub, and the unequal compressive forces imposed upon the seal may cause seal fracture at the junction of the hub and stem seal portions.

OBJECTS OF THE INVENTION

It is an object of the invention to provide a rotary joint for rotating heat exchangers having a high resistance to radial impact forces wherein the joint is of a concise configuration, and is of a lesser weight than rotary joints previously used in similar applications.

Another object of the invention is to provide an impact resistant rotary joint wherein destructive radial forces on the joint components are reduced by approximately 50% with respect to known constructions, and wherein the joint seal package is of a more rigid and stable configuration and installation than prior rotary joints used for similar purposes.

Yet another object of the invention is to produce an impact resistant rotary joint utilizing a nipple, a housing, and anti-friction bearings interposed between the nipple and housing wherein the housing is mounted upon the heat exchanger journal for rotation therewith, and the nipple is stationarily mounted upon a fluid supply head thereby reducing the impact forces on the bearings by reducing the mass that is not directly supported by the heat exchanger drum or roll.

A further object of the invention is to provide an impact resistant rotary joint which employs composite elastic glide rings at critical locations for the purpose of reducing the transmission of impact forces to the seal components and the nipple, and also, the glide rings function as seals to prevent flooding of the primary joint bearings in the event of seal failure.

An additional object of the invention is to provide an impact resistant rotary joint employing an annular seal having wall thicknesses of different diameter and wherein elastic seal rings used in conjunction with the seal are so positioned that the compressive forces imposed upon the seal by the rings are substantially equal minimizing the likelihood of fracture at stress locations defined by the intersection of the different seal diameter portions.

SUMMARY OF THE INVENTION

In the practice of the invention, a self-supporting rotary joint is associated with the end of a rotating heat exchanger, such as the drum or calendar roll of the type which are commonly used in the manufacture of paper. An annular assembly plate is bolted to the end of the journal of the drum or roll for rotation therewith, and the rotary joint housing is directly bolted to the assembly plate. Accordingly, both the assembly plate and joint housing rotate with the roll journal.

A fluid receiving head which is stationary and communicates with a supply of cooling or heating fluid or steam supports the outer end of an annular nipple of an elongated configuration. The nipple is received within the rotary joint housing and a pair of anti-friction bearings of the spherical roll type are interposed between the joint housing and nipple to maintain concentricity of these components during operation. A retaining ring bolted to the outer end of the housing maintains the bearings within the housing and locating shoulders defined upon the housing and nipple engaged by the bearings are used in conjunction with a retaining clip to maintain the assembly.

A primary seal package is located adjacent the end of the roll journal and substantially within the assembly plate. The seal package includes an annular countervseat supported on the inner end of the nipple which is engaged by an annular seal ring axially slidably supported within the assembly plate bore. The annular ring seal and counterseat each include a mutually engaging radial surface which permits rotation between the counterseat and annular ring seal while maintaining a fluid tight connection, and compression springs biasing the annular ring seal toward the counterseat maintain the engagement of the sealing surfaces of the seal package.

The seal ring is of a cylindrical configuration and includes a hub located within a cylindrical socket defined in the assembly plate. A reduced diameter cylindrical stem portion formed on the seal ring extends into the assembly plate bore. An O-ring mounted upon the seal ring stem engages with the assembly plate bore, and an annular glide ring mounted within the assembly plate socket engages the cylindrical hub of the seal ring. The radial compressive forces imposed on the seal ring stem by the O-ring, and on the seal ring hub by the glide ring, are substantially equal to minimize the likelihood of fracture of the seal ring at the intersection of the hub and stem portions, and also, the glide ring is of such construction as to absorb radial forces as may be imposed upon the assembly plate without transferring these forces directly to the seal ring.

A pair of annular glide rings are also mounted in the housing axially located between the primary seal package and the anti-friction bearings, and such glide rings function to absorb radial forces between the housing and the innermost end of the nipple, and also function as seals to prevent fluid escaping from the engaging counterseat and seal ring from entering the bearings to dilute and destroy the bearing lubricant. An additional annular glide ring is interposed between the housing retaining ring and the outer end of the nipple to also produce sealing and impact absorption.

The glide rings are, preferably, of a composite construction consisting of an inner ring of polytetrafluoroethylene circumscribed by an O-ring of rubber, neoprene, or the like. The polytetrafluoroethylene produces high wear resistance, and the elastic nature of the O-ring maintains the fluid tight characteristics of the glide ring assembly.

BRIEF DESCRIPTION OF THE DRAWINGS

The aforementioned objects and advantages of the invention will be appreciated from the following description and accompanying drawings wherein:

FIG. 1 is a diametrical, cross sectional, elevational view of an impact resistant rotary joint utilizing the concepts of the invention, FIG. 2 is an enlarged detail, cross sectional, view of the rotary joint illustrating the seal package and mounting of the joint upon the heat exchanger journal, the journal being shown in dotted lines, and FIG. 3 is an enlarged elevational sectional view of a glide ring illustrating the composite construction.

DESCRIPTION OF THE PREFERRED EMBODIMENT

An impact resistant rotary joint 10 utilizing the concepts of the invention is shown in its entirety in FIG. 1. The joint 10 is mounted upon the end of the journal 12 of a rotatable heat exchanger drum or roll supported upon bearings, not shown. The journal 12 is illustrated in dotted lines, FIG. 2, and includes an axial bore 14 intersecting a concentric counterbore 16 at the end of the journal. It is to be understood that the journal may take any conventional form, and that the concepts of the invention may be employed with a wide variety of journal configurations.

The rotary joint 10 includes an assembly plate 18 which is directly attached to the journal 12, the rotary joint housing 20 mounts upon the assembly plate, and the fluid conducting head 22 is attached to the tubular nipple 24 located within the housing 20. A seal package, generally indicated at 26, establishes a fluid tight relationship between the rotating and stationary components of the joint 10.

The assembly plate 18 includes a concentric cylindrical extension 28 which is closely received within the journal counterbore 16 so as to concentrically relate the assembly plate 18 and the journal 12. Bolts 20 extending through the assembly plate threaded into threaded holes within the journal attach the assembly plate to the journal end. The assembly plate includes a central bore 32 coaxial with the journal bore 14, and a cylindrical socket 34 intersects the bore 32 remotely from the journal.

The housing 20 includes a radial flange 36 through which bolts 28 extend for attaching the housing 20 to the assembly plate 18. The housing 20 also includes a bore 40 concentric to the axis of the assembly plate and journal, and the housing includes a cylindrical bearing recess 42 for receiving the primary bearings as later described.

An annular retaining ring 44 is bolted to the outer end flange of the housing 20 by bolts 46, and the retaining ring 44 is provided with a ridge which extends into the bearing recess 42 for engaging the bearings, as later described.

The fluid conducting head 22 includes an internal chamber 48 which includes the threaded port 50 whereby a fitting or conduit, not shown, may be attached to the head 22 for supplying the head with cooling water, steam, or whatever heat transfer medium is being used with the rotary joint 10. Because the head 22 is associated with a fluid conduit system the head 22 is stationary.

The head 22 includes a flange 52 having holes therein for receiving six bolts 54 which are threaded into threaded holes defined in the nipple radial flange 56. In this manner the nipple 24 is fixed to the head 22.

The nipple 24 includes a bore 58 which is concentric to the axis of rotary joint rotation, and at its innermost end the nipple is counterbored at 60.

The nipple 24 is supported within the housing 20 by a pair of axially spaced bearings 62 of the anti-friction type. Preferably, the bearings 62 constitute spherical roller bearings, and the bearing sets are separated by an annular spacer 64 located within the housing recess 42. The recess 42 includes a radial shoulder for positioning the bearings 62, and the retaining ring 44 will maintain the bearings within the recess 42. A ring 66 located within a groove in the nipple 24, in conjunction with a radial surface defined upon the nipple, positions the bearings with respect to the nipple, and in the aforedescribed manner relative rotation may occur between the housing 20 and nipple 24, while axial displacement therebetween is prevented.

It is a feature of the invention that the rotary joint seal package 26 be located adjacent the journal 12, and as will be appreciated from the following description, the seal package 26 is located within, and adjacent, the assembly plate 18.

The seal package 26 includes an annular seal ring 68 of a generally cylindrical configuration including a reduced diameter stem 70 which is located within the assembly plate bore 30 and a larger diameter cylindrical hub 72 which is located within the assembly plate socket 34. The seal ring 68 is axially displaceable with respect to the assembly plate 18 and eighteen compression springs 74 are located within blind holes defined in the assembly plate which bear against the hub 72 and axially bias the seal ring 68 toward the right. Two groove pins 76, FIG. 1, mounted in the assembly plate are received within holes in the hub 72 to prevent rotation of the seal ring 68, and the retaining ring 78 maintains the seal ring 68 within the socket 34 against the biasing action of the springs 74.

The seal ring 68 includes a radial seal-surface 80 extending toward the opposed end of the nipple 24, and a resilient O-ring 82 located within a groove in the stem 70 seals the ring 68 with respect to the assembly plate bore 32.

The other seal of the seal package 26 is the annular counterseat seal 84 which is located within the nipple outer end counterbore 60. The counterseat 84 includes a flat radial seal surface 86 which is engaged by the seal surface 80 of seal ring 68, and an O-ring 88 within the counterbore 60 seals the counterseat seal 84 with respect to the nipple 24.

As it is necessary that the seal ring 68 be axially displaceable within the assembly plate 18 so that the seal ring 68, under the influence of the springs 74, will maintain a sealed relationship at surfaces 80 and 86 as the seals 68 and 84 wear, radial tolerances between the seal ring hub 72 and the socket 34 must exist. To protect the seal ring 68 from impact forces being imposed thereon by the assembly in the event of paper web breakage, or the like, an annular glide ring 90 is interposed between the circumference of the hub 72 and the socket 34. The glide ring 90 is of a composite construction and is best appreciated from FIG. 3.

With reference to FIG. 3, an annular groove 92 is defined within the assembly plate 18, and an annular ring 94 is located within the groove 32 having an inner diameter which engages the circumference of the seal ring hub 72. The ring 94 is beveled at 96, and preferably, the ring 94 is formed of polytetrafluorethylene so as to have excellent self-lubricating and wear characteristics. The outer diameter 98 of the ring 94 is cylindrical, and is engaged by the resilient O-ring 100 located within the groove 92. The O-ring 100 may be formed of rubber, neoprene, or the usual elastic material from which conventional O-rings are formed. The O-ring 100 will maintain a radial compression upon the ring 94, and seal the ring 94 with respect to the groove 92 and assembly plate 18.

As will be appreciated in FIG. 3, a clearance 101 exists between the assembly plate socket and the seal ring hub 72 due to the tolerances therebetween, and the presence of the glide ring 90 will prevent the assembly ring 18 from directly engaging with the hub 2 even under high radial impact forces.

The O-ring 82 located within the stem 70 of the seal ring 68 also has a radial clearance with respect to the assembly plate bore 32, and the combination of the glide ring 90 and the O-ring 82 isolates the seal ring 68 from the assembly plate so as to prevent radial impact therebetween. Also, to improve the impact resistance of the seal ring 68 the glide ring 90 is designed such that the compressive forces imposed by the glide ring 90 upon the hub 72 of the seal ring 68 are substantially equal to the radial compressive forces imposed upon the seal ring stem 70 by the O-ring 82. This equalization of compression forces imposed upon the different wall thickness portions of the seal ring 68 minimizes the likelihood of the seal ring 68 fracturing at the junction of the stem 70 and hub 72.

A pair of glide rings 102 are located within grooves defined in the housing 20 intersecting the housing bore 40. The glide rings 102 engage the outer diameter of the nipple 24 adjacent its innermost end, and the glide rings 102 are of a construction similar to that described with respect to glide ring 90.

The glide rings 102 are located between the inner end of the nipple 24, and the seal package 26, and the bearings 62. Accordingly, in the event of fluid leakage through the seal package 26 the glide rings 102 will prevent the fluid medium from entering the housing recess 42 and contaminating the bearings 62. Preferably, grease fittings, not shown, are mounted on the housing 20 for communicating with the bearing recess 42 to permit lubrication of the bearings.

Additionally, a glide ring 104 is mounted within a groove formed in the retaining ring 44 for engaging the nipple 24 adjacent the flange 56. The glide ring 104 is similar in construction to that described with respect to glide ring 90.

Accordingly, it will be appreciated that by the use of the glide rings 102 and 104 radial impact forces which may be transferred from the housing 20 to the nipple 24 are dampened and absorbed by the glide rings.

Several radial weep holes 106 are preferably defined in the housing 20 adjacent the flange 36. The weep holes are in communication with the exterior of the counterseat seal 84, and in the event of leakage past the seal surfaces 80 and 86, due to wear or seal fracture, the fluid medium will escape from the housing 20 from the weep holes 106 preventing excessive pressure buildup within the rotary joint, and also indicate to the operator the existence of a seal problem.

Greater durability of the seal ring 68 and counterseat seal 84 is achieved by forming the seals of silicon carbide, rather than the usual sintered carbon, and it is to be appreciated that by locating the seal package 26 adjacent the end of the journal 12 impact forces which previously fractured rotary joint seals of this general type are controlled and minimized, and by the combination of locating the seal package 26 adjacent the end of the journal 12, and by the use of the glide ring 90, and the balancing of the compressive forces imposed upon the seal ring 68 significantly increased seal wear and resistance to impact forces has been achieved.

In addition to the advantages and impact force absorption between the housing 20 and nipple 24 as produced by the glide rings 102 and 104, the mounting of the housing 20 upon the assembly plate 18 such that the housing rotates with the journal, and the nipple 24 is stationary, reduces the mass of the rotary joint 10 which is not directly supported by the heat exchanger drum or roll, and the supporting of the major mass of the rotary joint directly upon the journal has significantly decreased rotary joint failures due to the type of impact as described.

It is appreciated that various modifications to the inventive concepts may be apparent to those skilled in the art without departing from the spirit and scope of the invention.

We claim:

1. An impact resistant rotary joint for use with rotating drum heat exchangers having a journal having an end and defining an axis of rotation comprising, in combination, an annular assembly plate having a bore having an axis, journal fastening means defined on said assembly plate for coaxially fastening said assembly plate to the heat exchanger journal for rotation therewith, an elongated annular housing having first and second ends and a bore having an axis, assembly plate fastening means defined upon said housing first end for coaxially mounting said housing first end upon said assembly plate for rotation with said assembly plate and the heat exchanger journal, a stationary fluid receiving head, an elongated stationary tubular nipple having an outer end mounted on said head in communication therewith and an inner end extending into said housing bore through said housing second end, bearing means interposed between said housing and said nipple locating said nipple concentric to said housing axis, a plurality of resilient annular glide rings interposed between said housing and said nipple absorbing radial impact forces between said housing and nipple, a first seal mounted upon said assembly plate within said bore thereof and axially displaceable with respect to said bore and a second seal mounted upon said nipple inner end sealingly engaging said first seal, said seals establishing a sealed relationship between the rotating journal, assembly plate and housing and said stationary nipple and head, at least one of said annular glide rings interposed between said housing and said nipple being located axially intermediate said nipple inner end and said bearing means to prevent fluid leaking through said first and second seals from entering said bearing means, said first and second seals each comprising an annular body having a cylindrical outer surface and each including a radial seal surface, said radial seal surfaces of said seals engaging in a sliding relationship, a cylindrical socket defined in said nipple inner end and said assembly plate bore receiving said bodies of said second and first seals, respectively, springs axially biasing said first seal toward said second seal, and an annular resilient guide ring mounted in said assembly plate circumscribing and engaging said first seal absorbing radial impact forces between said assembly plate and said first seal.

2. In an impact resistant rotary joint as in claim 1, said bearing means comprising a pair of axially spaced spherical roller bearings.

3. In an impact resistant rotary joint as in claim 1, said glide rings each comprising an annular ring of polytetrafluorethylene circumscribed by a resilient O-ring.

4. In an impact resistant rotary joint as in claim 1, said first and second seals being formed of silicon carbide.

5. An impact resistant rotary joint for use with rotating heat exchangers having a journal having an end and defining an axis of rotation comprising, in combination, an annular assembly plate having a bore having an axis, journal fastening means defined on said assembly plate for coaxially fastening said assembly plate to the heat exchanger journal for rotation therewith, an elongated annular housing having first and second ends and a bore having an axis, assembly plate fastening means defined upon said housing first end for coaxially mounting said housing first end upon said assembly plate for rotation with said assembly plate and the heat exchanger journal, a stationary fluid receiving head, an elongated stationary tubular nipple having an outer end mounted on said head in communication therewith and an inner end extending into said housing bore through said housing second end, bearing means interposed between said housing and said nipple locating said nipple concentric to said housing axis, a first seal mounted upon said assembly plate within said bore thereof and a second seal mounted upon said nipple inner end sealingly engaging said first seal, said seals establishing a sealed relationship between the rotating journal, assembly plate and housing and said stationary nipple and head, said assembly plate bore being cylindrical, a cylindrical socket defined in said assembly plate concentric to and intersecting said bore, said first seal comprising an annular body having a reduced diameter cylindrical stem slidably received within said assembly plate bore and a cylindrical hub of greater diameter than that of said stem slidably received within said socket, an annular resilient seal ring interposed between said first seal stem and said assembly plate bore imposing a radial compression force on said stem, and an annular elastic glide ring interposed between said socket and said seal hub imposing a radial compression force on said first seal hub substantially equal to said radial compression force imposed on said first seal stem by said seal ring.

6. In an impact resistant rotary joint as in claim 5, said glide ring comprising an annular ring of polytetrafluorethylene circumscribed by a resilient O-ring.

* * * * *